United States Patent

Hrovat et al.

[11] Patent Number: 5,682,316
[45] Date of Patent: Oct. 28, 1997

[54] VEHICLE TRACTION CONTROLLER WITH ENGINE AND BRAKE CONTROL

[75] Inventors: Davorin Hrovat; Minh Ngoc Tran; Craig John Simonds, all of Dearborn; John Loring Yester, Bloomfield, all of Mich.

[73] Assignee: Ford Motor Company, Dearborn, Mich.

[21] Appl. No.: 461,488

[22] Filed: Jun. 5, 1995

[51] Int. Cl.$^6$ .............................. B60K 28/16; F02D 9/02
[52] U.S. Cl. .................... 364/426.029; 364/426.031; 364/426.032; 180/197; 303/139
[58] Field of Search .................. 364/426.01, 426.02, 364/426.03, 431.04, 431.07, 426.027, 426.029, 426.031, 426.032; 180/197; 303/139, 142, 149, 155, 170, 112

[56] References Cited

U.S. PATENT DOCUMENTS

| | | | |
|---|---|---|---|
| 3,632,176 | 1/1972 | Gaeke | 303/21 |
| 3,752,251 | 8/1973 | Gaeke | 303/21 |
| 4,453,781 | 6/1984 | Poggie | 303/112 |
| 4,873,639 | 10/1989 | Sato et al. | 364/426.02 |
| 4,964,045 | 10/1990 | Iwata et al. | 364/426.02 |
| 5,019,984 | 5/1991 | Masaki et al. | 364/426.02 |
| 5,043,896 | 8/1991 | Sol | 364/426.02 |
| 5,089,967 | 2/1992 | Haseda et al. | 364/426.02 |
| 5,132,906 | 7/1992 | Sol et al. | 364/426.02 |
| 5,137,105 | 8/1992 | Suzuki et al. | 180/197 |
| 5,155,686 | 10/1992 | Shiraishi et al. | 364/426.03 |
| 5,159,990 | 11/1992 | Abe et al. | 180/197 |
| 5,172,319 | 12/1992 | Shiraishi et al. | 364/426.03 |
| 5,181,175 | 1/1993 | Shiraishi et al. | 364/426.03 |
| 5,195,808 | 3/1993 | Johnsen | 303/113.2 |
| 5,245,542 | 9/1993 | Itoh et al. | 364/426.02 |
| 5,249,851 | 10/1993 | Johnsen | 303/104 |
| 5,282,138 | 1/1994 | Sano | 364/426.03 |
| 5,311,433 | 5/1994 | Igata et al. | 364/426.01 |
| 5,325,300 | 6/1994 | Tsuyama et al. | 364/426.03 |
| 5,341,296 | 8/1994 | Yasuno et al. | 364/426.01 |
| 5,351,192 | 9/1994 | Tsuyama et al. | 364/426.03 |
| 5,364,175 | 11/1994 | Sakane et al. | 303/97 |
| 5,365,443 | 11/1994 | Tsuyama et al. | 364/426.03 |
| 5,431,242 | 7/1995 | Iwata et al. | 180/197 |
| 5,463,551 | 10/1995 | Milunas | 364/426.02 |
| 5,473,544 | 12/1995 | Yamashita | 364/426.03 |

*Primary Examiner*—Michael Zanelli
*Attorney, Agent, or Firm*—Allan J. Lippa; Roger L. May

[57] ABSTRACT

A vehicle traction controller includes engine control and brake control routines to improve vehicle traction. The engine control routine reduces average slip of driven wheels of the vehicle by retarding spark timing and by reducing air flow into the engine via an electronically controlled throttle. The engine control routine is entered if the average wheel speed of the driven wheels is above a predetermined threshold speed. Control of spark timing is performed by a Proportional-Differential (PD) control technique. The electronically controlled throttle is controlled by a Proportional-Integral-Differential (PID) control technique. The brake control routine operates to reduce the rotational speed of the driven wheel which has the highest rotational speed. The brake control routine is entered if one of the driven wheels has a rotational speed which is greater than a maximum desired speed and if the difference in speed between the driven wheels is greater than a maximum difference value. A PD control technique is employed to determine the amount of braking force generated by the brake control routine. Braking force generated by the brake control routine is gradually reduced when the rotational speed of each of the driven wheels falls below a threshold value.

10 Claims, 7 Drawing Sheets

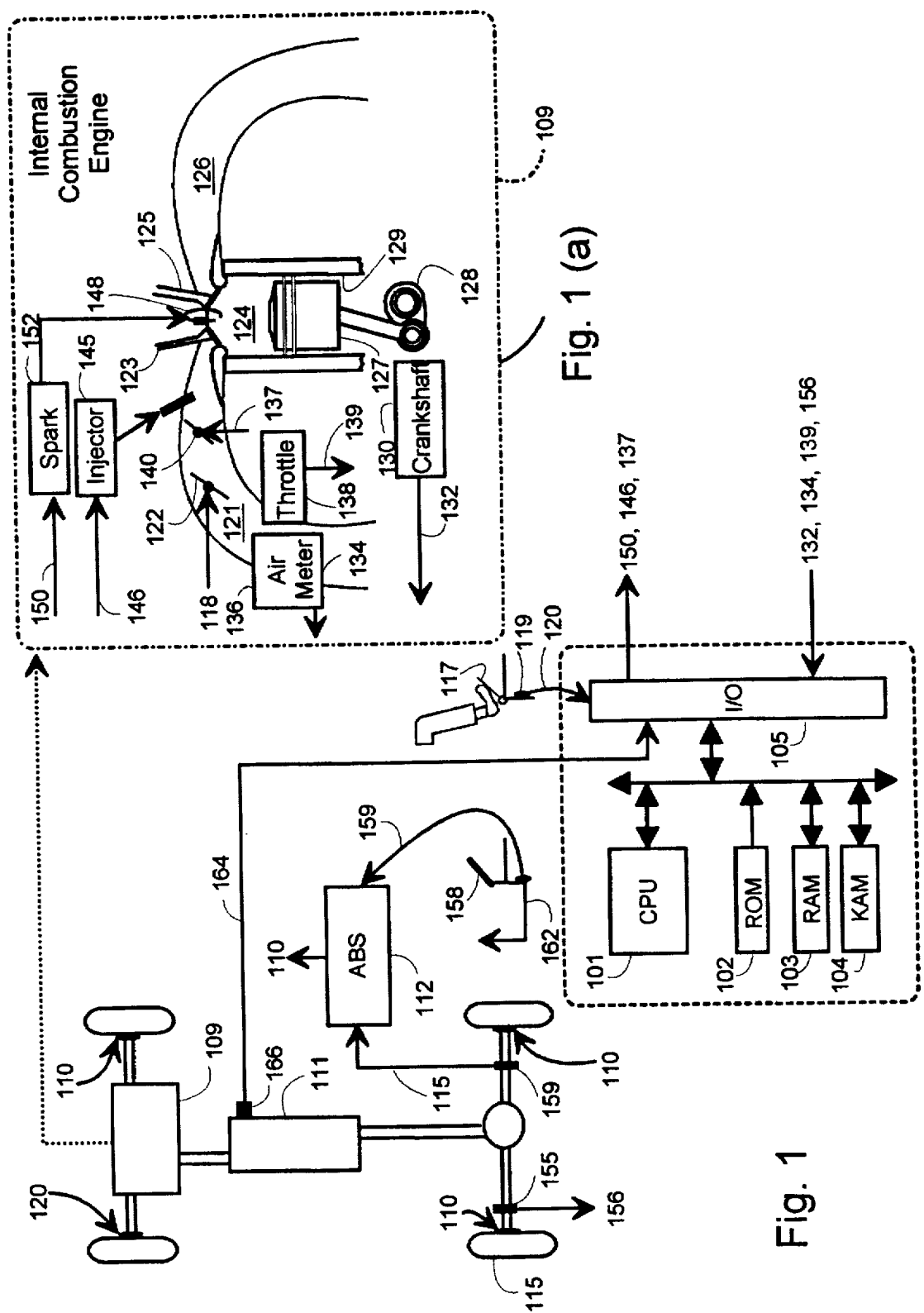

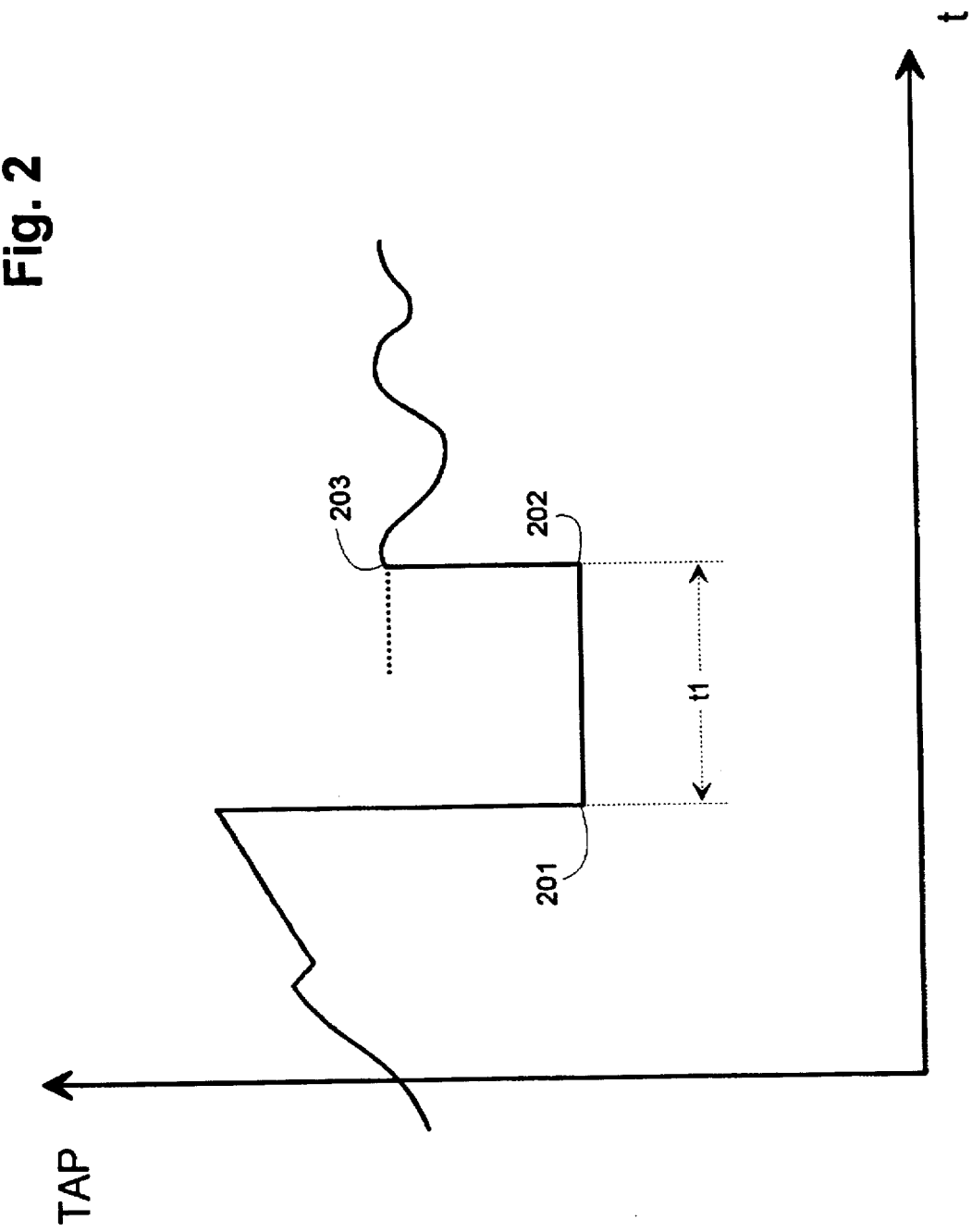

VEHICLE TRACTION CONTROLLER WITH ENGINE AND BRAKE CONTROL

FIELD OF THE INVENTION

The present invention relates generally to the field of vehicle traction control.

BACKGROUND OF THE INVENTION

Vehicle traction controllers are known which control spin of driving wheels of the vehicle by modulating both the power applied to the wheels from the vehicle engine, and by modulating braking forces applied to the driving wheels. While such traction controllers achieve increased vehicle traction through reduced wheel spin and skid, under certain conditions, the engine and brake control subsystems of such traction controllers may not complement each other in an integrated manner.

SUMMARY OF THE INVENTION

It is an object of the present invention to improve vehicle traction by use of a vehicle traction controller which controls engine and braking subsystems of the vehicle in a complementary manner to reduce stress on drivetrain components and achieve improved traction.

In a preferred embodiment, a vehicle traction controller includes a means for determining a friction value indicative of the frictional resistance of the surface upon which the vehicle is traveling. A means, responsive to the friction value, determines an actual slip value which is indicative of actual average slippage of driving wheels of the vehicle relative to the surface below the driven wheels. A means, responsive to a plurality of wheel speed signals, where each of the wheel speed signals is indicative of the rotational speed of a corresponding driving wheel of the vehicle, compares each of the wheel speed signals to generate a maximum rotational speed value which is indicative of the rotational speed of the driving wheel having the greatest rotational speed. A means, responsive to the actual slip value, controls power delivered to driving wheels of the vehicle to reduce the actual slip value to a value below a predetermined slip value. A means, responsive to the maximum rotational speed value, generates a braking force value, which is indicative of a braking force to be applied to the wheel corresponding to the maximum rotational speed value, to reduce the rotational speed of the wheel.

An advantage is that by controlling the engine to reduce the average slip of the driving wheels and that by controlling the brakes to reduce excessive one-wheel slip, vehicle traction is improved and stress and wear on engine and braking subsystems is reduced by controlling each of the subsystems in a manner which is complementary to the other.

These and other features and advantages of the present invention may be better understood by considering the following detailed description of preferred embodiments of the invention. In the course of this description, reference will be made to the attached drawings.

BRIEF DESCRIPTION OF THE DRAWINGS

FIGS. 1 and 1a are a schematic drawing of a preferred embodiment;

FIG. 2 shows the operation of a preferred embodiment in graphical form; and

DETAILED DESCRIPTION

Figure 3A:
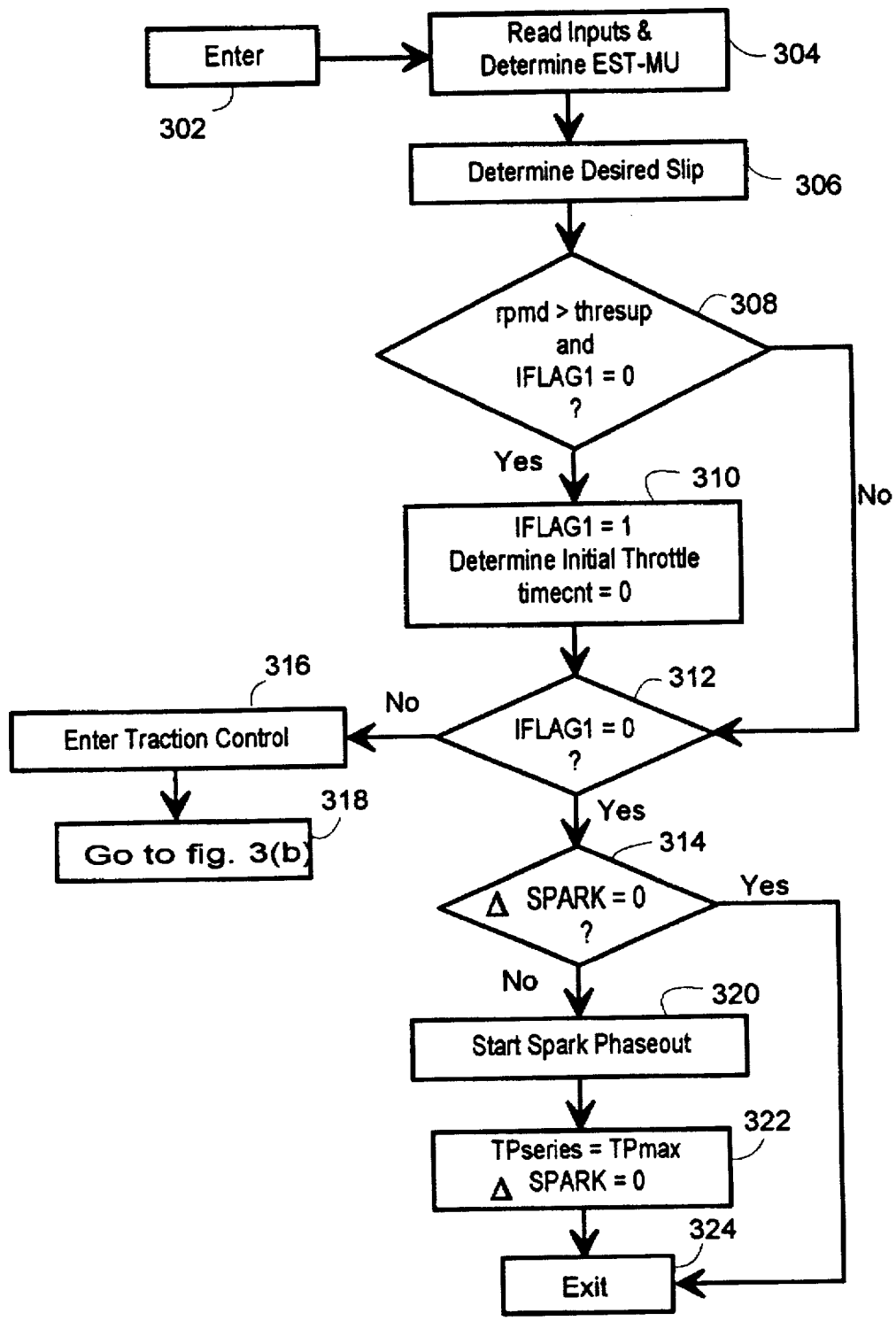
FIGS. 3(a), 3(b), 4(a), 4(b) and 4(c) are flowcharts showing the steps executed by a preferred embodiment.

In FIG. 1 of the drawings, a Powertrain Control Module (PCM) 100 controls the operation of a vehicle powertrain which includes a conventional internal combustion engine 109, transmission and drivetrain, seen generally at 111, and a braking control module seen at 112, which includes anti-lock braking and traction control capability. The powertrain controller preferably includes a central processing unit 101, a read-only memory (ROM) 102 for storing control programs, a random-access memory (RAM) 103 for temporary data storage, a keep-alive-memory (KAM) 104 for storing learned values, and a conventional data bus and I/O ports 105 for transmitting and receiving signals to and from the vehicle powertrain.

In FIG. 1 a pair of driving wheels is shown at 115. The driving wheels 115 are illustrated in FIG. 1 as being the rear wheels of the vehicle. Alternatively, the driving wheels may be the front wheels of the vehicle, or all four-wheels of the vehicle.

The vehicle preferably includes an electronic throttle controller which operates in response to gas pedal position and other inputs such as engine speed and wheel slip and spin. The position of the gas pedal, seen at 117, is preferably sensed by a gas pedal position sensor 119 which takes a conventional form in order to sense the position of the gas pedal and transmit a representative signal 141 to the powertrain controller 100. The gas pedal operates primary throttle 122 via a conventional linkage seen at 118. The components of the vehicle powertrain such as the engine 109, transmission and drivetrain 111 and the brake control module 112 are conventional and operate in conjunction with powertrain controller 100 to implement a traction control system. Wheel speed sensors, one of which is shown at 155, detect the rotational speed of each of the wheels of the vehicle and transmit a wheel speed signal 156 to the powertrain controller 100. The wheel speed sensors preferably take the form of Hall effect sensors. The anti-lock braking system is conventional and preferably is capable of independently modulating the braking force upon each wheel, either in response to a brake pedal signal 159, input from the driver via the vehicle brake pedal, seen at 158 or in response to input from the electronic traction controller. A brake pedal signal 162 provides an indication of the application of the brake by the vehicle driver. A torque converter turbine speed signal (TSS) 164, which is indicative of torque converter turbine speed, is generated by a conventional sensor 166 positioned in the transmission.

The vehicle also preferably employs a torque estimation technique to determine the torque at the driving wheels. A preferred form of torque estimation to determine powertrain torque is described in U.S. Pat. No. 5,452,207 entitled "Robust Torque Estimation Using Multitudes of Models" assigned to the Ford Motor Company and in the names of Davorin Hrovat and Lee-Frei Chen, which is hereby incorporated by reference. Preferably torque estimation to determine torque from braking forces is also employed in determining the torque at each of the driving wheels. A preferred form of torque estimation to determine such a torque is described in U.S. Pat. No. 5,551,770 "Method for Estimating a Pressure in a Pressure Actuated Controller", assigned to the Ford Motor Company and in the names of Davorin Hrovat and Mirth Ngoc Tran, which is hereby incorporated by reference. Alternatively, the torque at each of the driving wheels may be detected by a wheel torque sensor such as seen at 159. Such a sensor may be of conventional type, such as a model manufactured by Lucas Schaevitz Company.

FIG. 1(a) of the drawings shows a cylinder of the engine 109 in greater detail. In FIG. 1(a), engine 109 draws an aircharge through an intake manifold 121, past a throttle plate 122, an intake valve 123 and into combustion chamber 124. An air/fuel mixture which consists of the aircharge and fuel, is ignited in combustion chamber 124, and exhaust gas produced from combustion of the air/fuel mixture is transported past exhaust valve 125 through exhaust manifold 126. A piston 127 is coupled to a crankshaft 128, and moves in a reciprocating fashion within a cylinder defined by cylinder walls 129.

A crankshaft position sensor 130 detects the rotation of crankshaft 128 and transmits a crankshaft position signal 132 to PCM 100. Crankshaft position signal 132 preferably takes the form of a series of pulses, each pulse being caused by the rotation of a predetermined point on the crankshaft past sensor 130. The frequency of pulses on the crankshaft position signal 132 are thus indicative of the rotational speed of the engine crankshaft. A Mass AirFlow (MAF) sensor 134 detects the mass flow rate of air into intake manifold 121 and transmits a representative air meter signal 136 to PCM 100. MAF sensor 134 preferably takes the form of a hot wire air meter. A throttle position sensor 138 detects the angular position of primary throttle plate 122 and transmits a representative signal 139 TO PCM 100. Throttle position sensor 138 preferably takes the form of a rotary potentiometer. The engine 109 preferably makes use of an electronically controlled throttle in the form of a series throttle which comprises a secondary throttle plate 140 positioned downstream of driver actuated throttle 102. The secondary throttle 140 operates under control of PCM 100 to vary the airflow flowing past driver actuated throttle 122. Alternative forms of electronic throttles may also be used, including a cable stretcher type throttle, or a single full authority electronic throttle.

Injector actuators 145 operate in response to fuel injector signal 146 generated by PCM 100 to deliver an amount of fuel determined by fuel injector signal 146 to combustion chambers 124 of the engine. Spark plug 148 ignites the air/fuel mixture in combustion chamber 124 according to a spark control signal 150 generated by PCM 100 and transmitted to spark actuator 152.

Figure 3B:
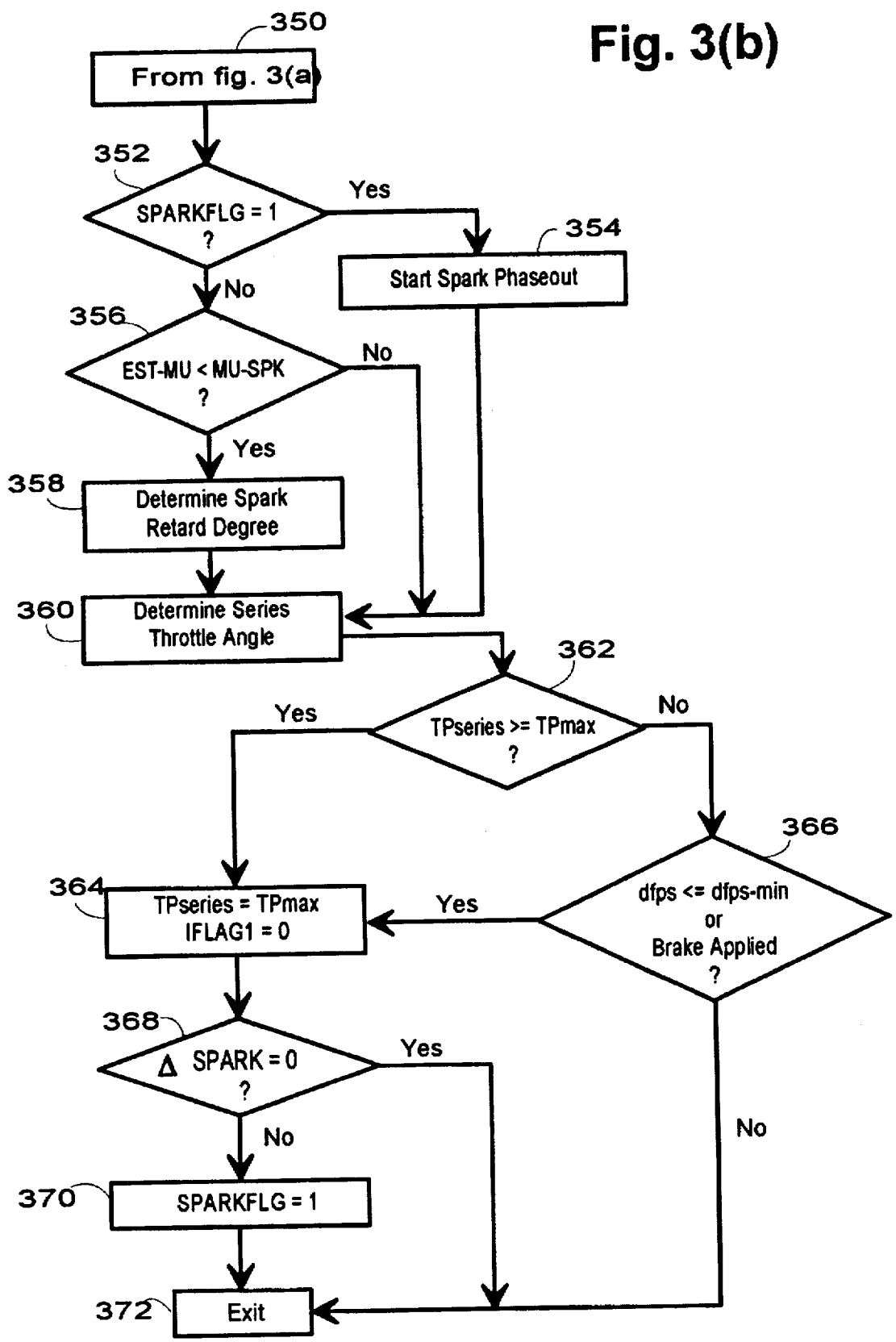
Figure 4A:
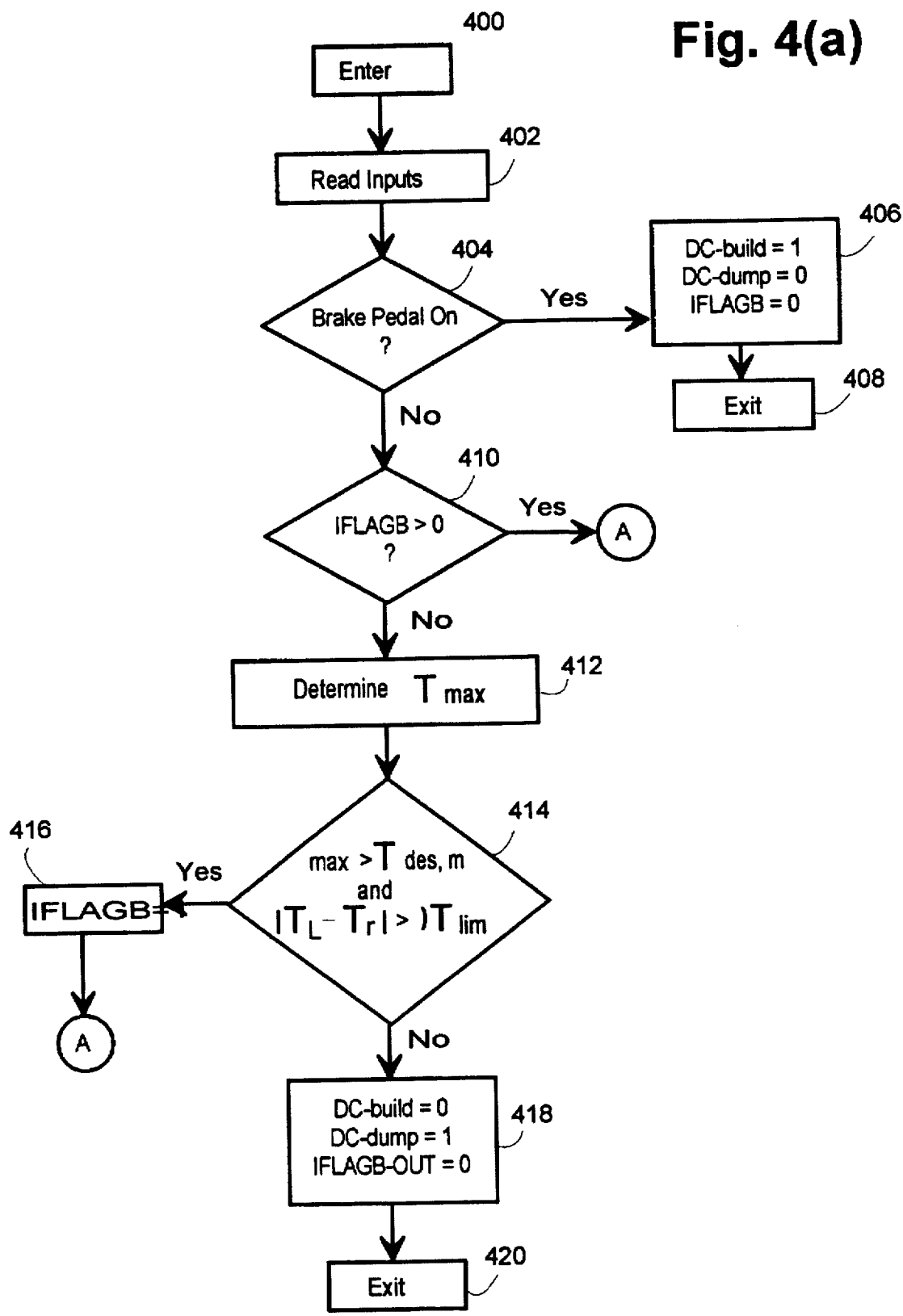
Figure 4B:
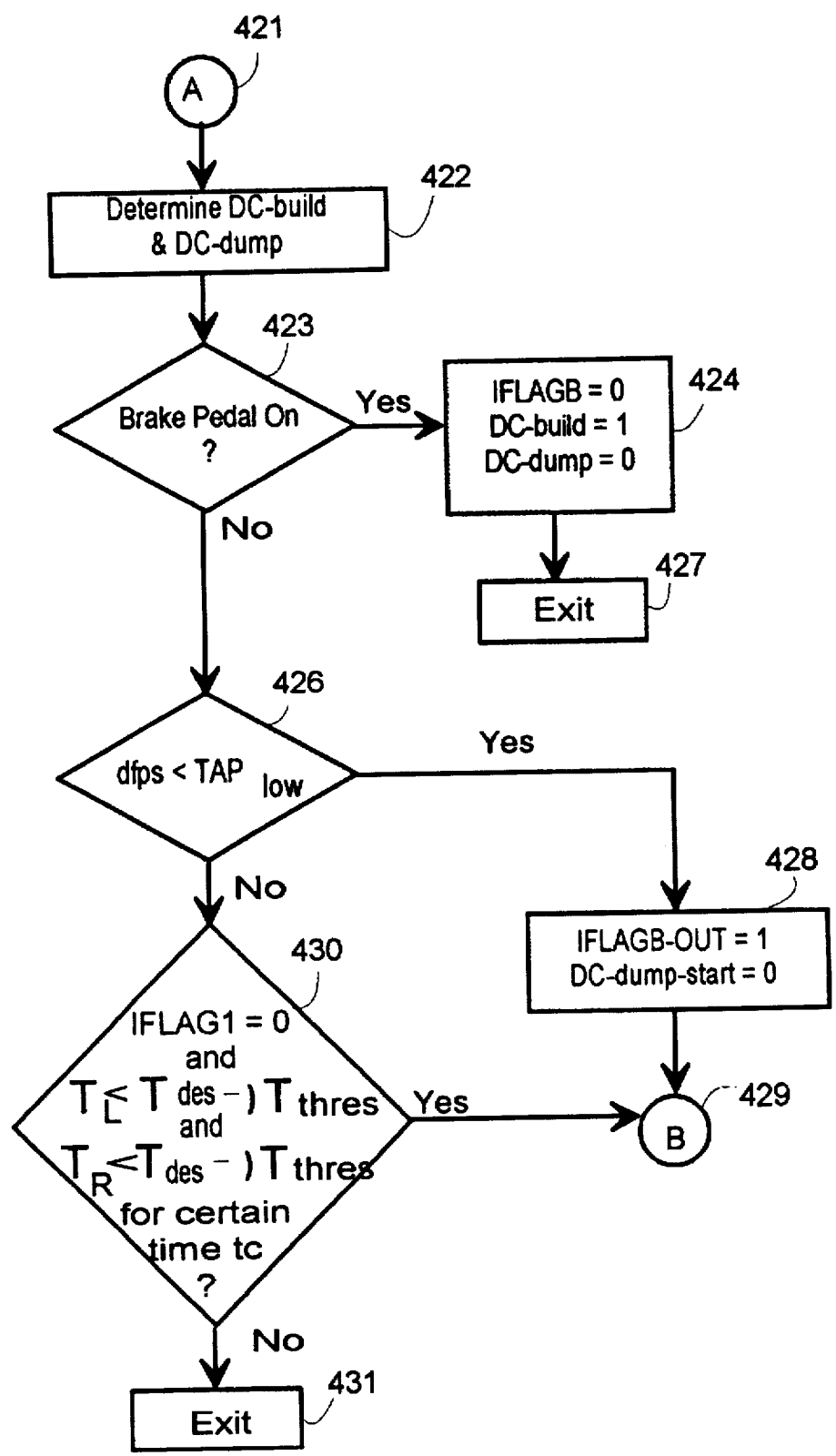
Figure 4C:
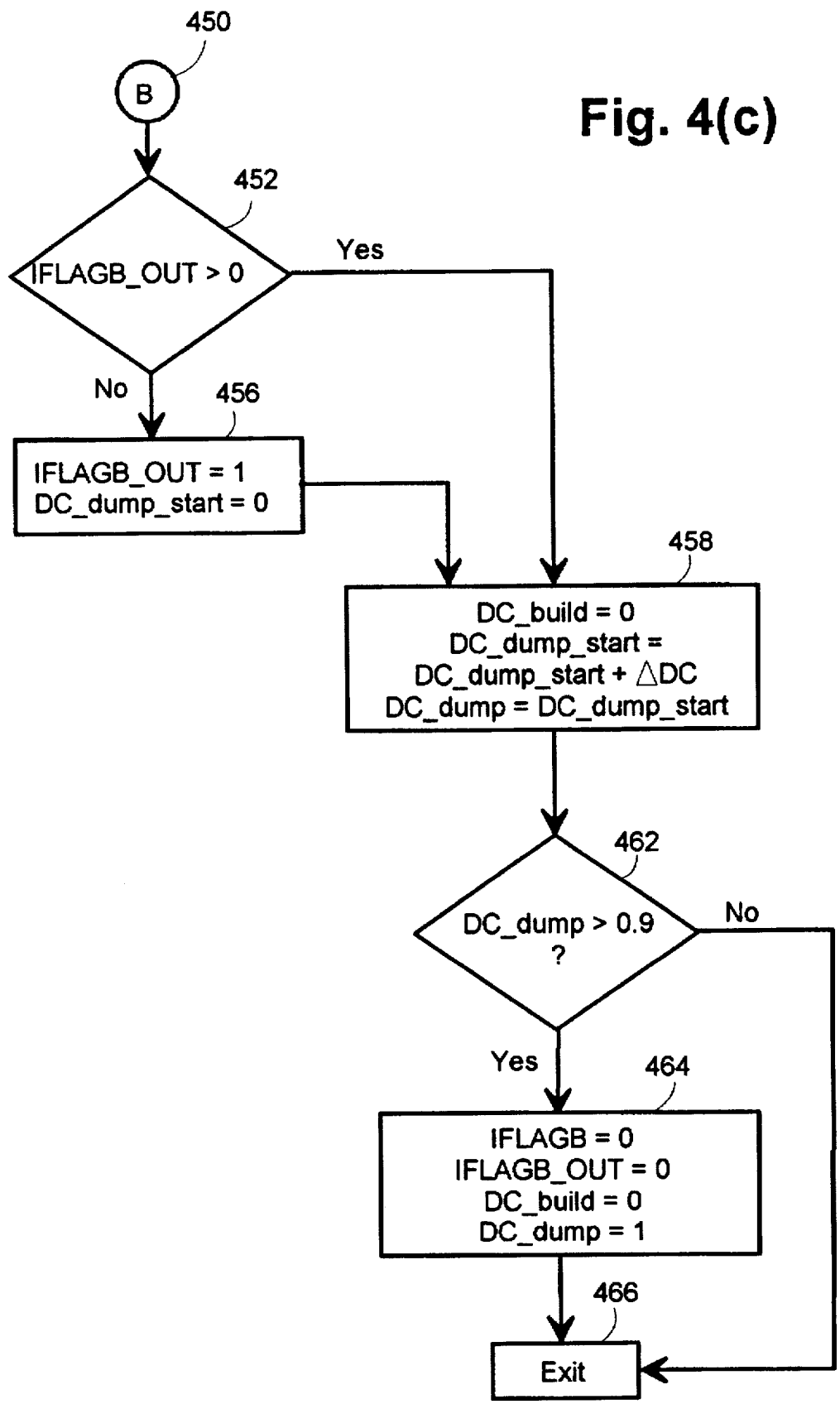

PCM 100 advantageously controls the power generated by engine 109 and braking forces generated by braking module 112 to control traction of the wheels of the vehicle in a complementary manner which reduces stress placed on powertrain components. FIGS. 3(a) and 3(b) are flowcharts showing an engine traction control routine executed by PCM 100 to implement an engine traction control sub-system of a traction controller, and FIGS. 4(a), 4(b) and 4(c) are flowcharts showing a brake traction control routine executed by PCM 100 to implement a brake traction control subsystem of a traction controller. The routines shown in FIGS. 3(a), 3(b), 4(a), 4(b) and 4(c) are preferably executed every twenty to forty milliseconds during vehicle operation.

The engine traction control subsystem advantageously controls the average slip of the two driving wheels (for two-wheel drive vehicles, otherwise the average slip of the four driving wheels for four-wheel drive vehicles) based on measured (average) slip and estimated, effective "average" coefficient of road-related friction.

The engine traction control routine is entered at step 302 and at step 304, a plurality of powertrain operating parameters are detected. Preferably, the following signals are received by the PCM 100 and converted into digital form: a brake actuation signal which is indicative of application by the driver of the vehicle brakes, a torque converter turbine speed signal (TSS) which is indicative of torque converter turbine speed, an engine speed signal which is indicative of the rotational speed of the engine, a plurality of wheel speed signals, indicative of the rotational speeds of each of the vehicle wheels, and a driver foot position (gas pedal position) signal indicative of the position of the gas pedal 117.

An effective estimated value of the frictional resistance of the road surface (EST_MU) is then calculated as a function of the signals (brake actuation signal, TSS signal, engine speed signal, the four wheel speed signals, and driver foot position signal) detected at step 302. Preferably such a calculation is performed according to the procedure described in U.S. Pat. No. 5,278,761, which is hereby incorporated by reference. The value EST_MU is an average, effective estimate for left and right driving wheels, taking into account the (possibly) applied brakes. For example, if brakes are applied on the left wheel, then the value EST_MU will be higher than the actual average friction under the two driving wheels. This higher average number is advantageously appropriate for engine control, since the friction represented by the value EST_MU is the friction "seen" by the engine, and it determines the prevailing operating region for the engine dynamics.

Preferably, when the engine is first started EST_MU is initialized at a value indicative of a high frictional resistance. Alternatively, the time elapsed since the engine was turned off may be considered, and if this time is less than a predetermined limit value, then the value of EST_MU just before the engine was turned off is used.

As an alternative to utilizing a single value indicative of road friction, two values indicative of road friction may be generated. A first friction value, representing a low-pass filtered estimate, would be used for continuous, "slow" adaptation of control parameters to varying road conditions during wheel spin traction control. A second friction value, would represent a "fast" estimate, with minimum or no low-pass filtering. Such a mechanism is preferably used at the very beginning of traction/spin control to establish the proper control setting such as a throttle (initial) preset angle (at the start of spin control) and different control gains.

Initially, upon entry of the engine traction control routine, the secondary throttle 140 is advantageously prepositioned, according to the value of EST_MU and controlled utilizing open-loop control techniques, as shown graphically in FIG. 2. This step is advantageously performed upon the entry of traction control routine to quickly reduce wheel slip. Thereafter, closed-loop control techniques are preferably used. Upon re-entry into the engine traction control routine, after exiting the routine, the procedure shown graphically in FIG. 2 is again employed. As seen in FIG. 2, traction control is initiated at point 201, by setting a secondary throttle position value (TAP) to a predetermined initial value, which as mentioned above, is advantageously a function of EST_MU. The secondary throttle position value is maintained at the predetermined initial value for a predetermined amount of time (t1). Thereafter, as seen at point 202, the secondary throttle 140 is set to a second predetermined value which is also a function of EST_MU. Closed-loop control of the secondary throttle position is then started at point 202. Alternatively, the TAP value may also be determined with the help of two-dimensional tables stored in ROM 102 and indexed by engine torque and engine speed. For some vehicles, the period t1 equals zero, which advantageously results in a simple control strategy, with the initial position of the secondary throttle being determined and thereafter utilizing closed-loop control techniques which are explained herein.

An alternative to the control strategy shown in FIG. 2, is to calculate (either off-line or on-line in case of sufficient micro-controller processing power) the needed TAP value required to bring wheel spin within a desired range from target in minimum time (taking into account throttle saturation at the minimum possible position). This is also an open-loop control technique which assumes that the estimated road surface friction remains constant during the time required to reach the wheel slip range. Thereafter, the closed-loop slip control resumes in a continuous manner. The determination of TAP during open-loop control may be done either via the above procedure or through inverse dynamic (feedback i/o linearization) on a postulated desired wheel slip trajectory.

In general, different values of EST_MU will lead to different controllers with different gains and possibly parameters and even structure. A simple alternative is to just change the integral control gain ki of the controller in a prescribed manner. In particular, with t1=0 the control gain ki may be linearly increased over a period of time (t2) from an initial low value (for ice) to a new value corresponding to the value of EST_MU. In the special case when t2=0 this leads to a discontinuous control gain at the start of spin control, which is sometimes acceptable if an incremental type of Proportional-Integral-Differential (PID) control for control of the secondary throttle is used. If incremental PID control is not used, then appropriate low-pass filtering of the control gain ki can smooth the discontinuity.

At step 306 a desired slip value is calculated based on prestored values as a function of EST_MU. Alternatively, the desired slip value may be obtained by a measurement of the steering angle, or from an estimate based on the rotational speed of the non-driving wheels of the vehicle. At step 308, traction control is triggered if the average driving wheel speed (rpmd) exceeds a threshold (thresup) above the desired slip for a predetermined time period t3 and if IFLAG1 equals zero, meaning that traction control is not currently in progress. Often t3=0, so that the first crossing of thresup will trigger the control. As an additional entry the rate of change of the average driving wheel speed may also be considered, with lower average driving wheel speed required to trigger traction control.

If both conditions at step 308 are satisfied then the routine proceeds to step 310 where an initial position for the secondary throttle 140 is determined, the traction control flag IFLAG1 is set to a value of one, and a traction control time counter (timecnt) is initialized to a value of zero. The counter timecnt indicates the length of time the traction control routine has been operating, and is reset every time traction control is entered. The initial position for the secondary throttle is determined as described above in the description accompanying FIG. 2.

After step 310, or if either of the tests at 308 is not true, then at step 312, traction control flag IFLAG1 is tested to determine if traction control is enabled. If IFLAG1 is equal to one then traction control is enabled and traction control is entered at step 316, the details of which are shown in FIG. 3(b). If IFLAG1 is equal to zero, then traction control is disabled, and at step 314 a spark deviation value ΔSPARK is checked to determine the amount of deviation due to traction control of current spark timing from normal spark timing. If no deviation is found, i.e. ΔSPARK equals zero, then the engine traction control routine is exited at step 324. Otherwise, if a spark deviation is found at step 314 then at step 320, spark phaseout is initiated. The engine traction control routine advantageously controls engine power by controlling spark timing, in a manner described in greater detail in the description accompanying FIG. 3(b). At step 320, because traction control is not to be entered, then spark timing, as it deviates from normal spark timing, is gradually reduced so as not to cause a sudden torque disturbance. At step 322, the secondary throttle 140 is set to a maximum (i.e. wide open position) and deviation from spark timing is eliminated by setting Δspark equal to zero, and the engine traction control routine is exited at step 324.

FIG. 3(b) of the drawings shows the steps executed if IFLAG1 is found to not equal zero at step 312. At step 352, a spark phaseout flag, SPARKFLG is checked to determine if phaseout of spark timing should be performed. If SPARKFLG equals one, then at step 354, spark timing retard due to traction control is gradually reduced and the routine proceeds to step 360. If at 352 SPARKFLG does not equal one, then at step 356, the value EST_MU is compared to a spark control threshold value which is indicative of a frictional resistance of the road surface, above which control of spark timing is not used to achieve traction control. On surfaces with low coefficients of friction, engine torque is reduced by retarding spark timing to achieve improved traction. At step 358, the amount of spark retard is determined by a Proportional-Differential (PD) control technique.

As an alternative, during an initial (short) period an aggressive spark at maximum possible retard may be used for given engine load/speed conditions in order to reduce wheel spin. Such a procedure is preferably used only for a short period of time t4, equal typically to about 0.3 to 1.0 seconds, in order to improve driveability and to reduce catalyst burn-out. Thereafter, closed loop spark control is employed. The closed-loop spark control is preferably based on average slip error of the two driving wheels. While other closed-loop control techniques may be employed, a PD controller is preferred to minimize spark steady-state offset from nominal. Preferably, the spark timing is offset from nominal timing, by approximately fifteen degrees retard in order to the PID controller to either retard or advance spark timing to achieve increased or decreased engine torque output. The offset of spark timing from nominal is preferably restricted for a time period t5 and then is gradually changed back to nominal by setting the spark phaseout flag SPARKFLG equal to one. Because spark timing and engine torque output exhibit a non-linear relationship, the static inverse of this relationship may be employed so as to effectively (statically) linearize the relationship.

Instead of basing the spark feedback on wheel slip, as an alternative it is possible to base it on engine speed, or the combination of wheel slip and engine speed. Preferably, the amount by which spark timing is altered (ΔSPARK) is restricted to a maximum spark change value which is a function of engine speed and load.

At step 360, the throttle angle of the secondary throttle 140 is determined by a PID control technique in order to further control engine torque. Preferably the secondary throttle angle control is based on the slip error which is determined at step 306. Different closed-loop control techniques are possible but incremental type of PID control is preferred.

At step 362, a test is performed to determine if the secondary throttle position TPseries calculated at step 360 is greater than or equal to a predetermined maximum position, Tpmax. If so, then at step 364, the secondary throttle position is limited to the maximum position by setting Tpseries equal to Tpmax, and IFLAG1 is set to zero to disable engine traction control. At step 368, ΔSPARK is tested, and if it is equal to zero, meaning that spark timing is not being altered by the engine traction control routine, then the engine traction control routine is exited. Otherwise, at step 370, SPARKFLG is set to one to phase out spark control at step 354 upon subsequent execution of the engine control routine and the routine is exited.

If at step 362, TPseries is less than TPmax then at step 366, a gas pedal position value (dfps) is compared against a predetermined minimum position value (dfps-min) to determine if the gas pedal is released. The brake pedal position is also tested to determine if the brakes are being applied by the driver. If the gas pedal is released or if the brakes are being applied, then the routine proceeds to step 364. The tests performed at step 366 essentially indicate the driver's desired action. If the gas pedal position value is less than dfps-min or if the brake pedal is being applied, then engine traction control is not required and at step 364 the secondary throttle 140 is set to the maximum open position so that air flow into the engine intake manifold is not restricted, and therefore controlled, by the secondary throttle. Otherwise, the engine traction control routine is exited at step 372.

FIGS. 4(a), 4(b) and 4(c) show the steps of a brake traction control routine which reduces spinning of driving wheels of the vehicle. The brake traction control routine is preferably executed after, or in parallel with, the execution of the engine traction control routine. The brake traction control routine is entered at step 400, and at step 402, the rotational speed of each wheel, as reflected in the wheel speed signals, is determined.

Next, at step 404, a test is performed to determine if the brakes are being applied by the driver. If so, then the brake traction control routine is exited at step 408, by first setting brake traction control variables DC-build and DC-dump to one and zero respectively, and setting a brake control flag (IFLAGB) equal to zero. A value of zero for IFLAGB indicates that brake traction control is disabled, and brake traction control is thus exited at the appropriate step. A value of one for IFLAGB indicates that brake traction control is enabled, and the routine is continued at the appropriate step. Variables DC-build and DC-dump implement a dual valve brake pressure control system in which a valve controlled by DC-build builds braking pressure and a valve controlled by DC-dump reduces braking pressure. A value of one for DC-build causes pressure to build, in order to increase braking force, and a value of zero causes the build valve to remain in the same position to maintain the pressure. A value of zero for DC-dump causes the dump valve to remain in the same position to maintain brake pressure, and a value of one causes the dump valve to open to reduce brake pressure and thus braking force.

If the brake pedal is not being applied by the driver, then at step 410, IFLAGB is tested to determine if brake traction control is enabled. A value of one for IFLAGB indicates that brake traction control is active, and a value of zero for IFLAGB indicates that brake traction control is inactive. If brake traction control is inactive then at 412, the maximum rotational speed of the left and right driving wheel (ωmax) is determined by determining the rotational speeds of the left and right driving wheels and (ωl and ωr respectively), comparing the values to determine which wheel speed is higher and setting ωmax equal to the higher of the two values.

At 414, two brake traction control entry tests are performed to determine if conditions warrant the entry of brake traction control. The value ωmax is compared to a value ωdes,m which is indicative of a maximum desired wheel speed. Preferably ωdes,m is implemented as a function of actual vehicle speed, and possibly EST_MU, and is retrieved from a table in ROM which stores a plurality of values, indexed by vehicle speed. The second comparison performed at 414 is performed to determine if the difference in the speeds of the left and right driving wheels is greater than a predetermined wheel difference value Δωlim, which can take the form of either a single value, or alternatively, may be a function of vehicle speed, in which case a plurality of values may be stored and retrieved according to vehicle speed. If both of the comparisons at step 414 are true then at step 416, IFLAGB is set to a value of one to initiate brake traction control as shown in more detail in FIG. 4(b). If either of the tests at step 414 is not true, then conditions are such as to not warrant brake traction control and at step 418, the variables DC-build and DC-dump are set to zero and one respectively to reduce braking force and the routine is exited at step 420. Checking for the difference between the left and right wheel speeds (|WL−WR|) advantageously reduces unnecessary usage of the brakes on, for example surfaces with uniform friction, where engine based traction control alone is quite effective. This is especially true for most of current practical brake hardware that is speed-limited. The brakes are advantageously applied primarily in situations where they are most useful, which is surfaces with differing frictional resistances. The above check can further be enhanced by virtue of a timer which checks if the above conditions have been satisfied for a time period (tA). This reduces possible hunting around the above conditions.

In the case that at least one of the brake control entry conditions at step 414 has not been satisfied, at 418 the build valve solenoid is closed by setting DC-build to zero and the dump valve solenoid is opened by setting DC-dump to one. The flag IFLAGB_OUT is initialized by setting it to zero.

FIG. 4(b) of the drawings shows the steps executed after step 416. Preferably a proportional-differential (PD) control strategy is employed at step 422 to determine values for DC-build and DC-dump, which is based on the difference in wheel spin of each driving wheel from a desired wheel spin value to determine the braking force applied to the driving wheels. The brake traction control routine shown in FIG. 4(b) is based on duty cycle (DC) control of, the build as well as the dump values. Thus 0% DC_build and 0% DC_dump means that the brake caliper pressure remains constant (assuming no leakage). Roughly speaking, the duty cycle percentage acts to control the rate of pressure rise (DC_build) or fall (DC_dump), in effect creating an integral-like actuator effect.

Preferably, only the wheel with higher slip is controlled. This minimizes brake usage and in effect controls traction on surfaces in which the frictional resistance varies between the driving wheels of the vehicle, a condition which is termed herein as a "split-mu" surface. Moreover, due to the integral effect of the brake actuator, the PD control is effectively closer to a non-linear proportional-integral (PI) control on a split-mu surface.

At step 423, a test, similar to that performed at step 404, is performed to determine if the brake pedal is applied, in which case the routine is exited by first setting IFLAGB=0, DC_build=1 and DC_dump=0, to facilitate brake-pedal induced pressure buildup.

At step 426, the driver actuated throttle position, represented by value dfps, is compared to a minimum throttle position value (TAP-low) which is indicative of a minimum threshold throttle position required for brake traction control. Typically, the throttle position is less than the minimum throttle position during sudden tip-outs. Such a test advantageously prevents wheel locks due to brake application during sudden tip-outs. If the throttle position is less than the minimum throttle position, at 428, IFLAGB-OUT is set to a value of one, DC-dump-start is set to a value of zero and the routine proceeds to the steps shown in FIG. 4(c). In addition, the secondary throttle position may be compared to a maximum throttle position in a test similar to that performed at step 362 to determine if engine traction control is ending, and then initiate ending of the brake traction control.

If at 426 the throttle position is greater than or equal to the minimum throttle position, then at 430, two tests are performed to determine if the wheel slips of each of the driven wheels are very small, i.e. corresponding wheel speeds are below a desired wheel speed ($\omega$des) for more than certain threshold ($\Delta\omega$thres), for a predetermined time duration tc. The desired wheel speed $\omega$des is preferably a function of at least vehicle speed and EST_MU. The threshold value $\Delta\omega$thres advantageously improves driveability by reducing the chance that brake control will be applied for an unnecessarily long period of time. Also at step 430, the flag IFLAG1 is tested to determine if engine traction control has been exited. If at 430, each of the wheel speeds is less than the value ($\omega$des−$\Delta\omega$thres) for the period of time tc, and if engine has been exited, then the routine proceeds to the steps shown in FIG. 4(c), where braking force due to the brake traction control routine is gradually reduced. Otherwise the brake traction control routine is exited.

In FIG. 4(c) at step 452, the flag IFLAGB_OUT is tested to determine if brake traction control is to be exited. If IFLAGB_OUT is greater than zero, then at step 458, the build value DC-build is set to zero to stop build up of pressure and the dump value is altered by a brake pressure change value $\Delta$DC to cause a reduction in the braking force applied to the spinning driven wheel. If IFLAGB_OUT equals zero at step 452 then at 456 the flag IFLAGB_OUT is set to a value of one to cause immediate reduction in brake pressure upon subsequent execution of the brake control routine, and DC-dump-start is set to an initial value of zero, which causes the dump valve to maintain brake pressure. At step 458, the dump value DC-dump is incrementally altered by $\Delta$DC to gradually reduce brake pressure. The dump change value $\Delta$DC is preferably a calibratable constant. At step 462, the dump value DC_dump is compared to a predetermined value to determine if it is almost fully open, i.e. close to zero. If so, then at step 464, the build and dump valves are set to zero and one respectively to reduce braking pressure due to brake traction control, IFLAGB is set to zero to disable brake traction control and IFLAGB_OUT is reset to zero. If at step 462, the dump value is less than or equal to 0.9, then the brake traction control routine is exited.

It is to be understood that the specific mechanisms and techniques which have been described are merely illustrative of one application of the principles of the invention. Numerous modifications may be made to the methods and apparatus described without departing from the true spirit and scope of the invention. For instance, additional timers can be included to limit brake application duration based on a suitable thermal model (possibly semi-empirically obtained). Similarly, spark control duration can be limited based on empirically obtained periods which may be functions of engine load/speed, catalyst conditions, and engine temperature.

What is claimed is:

1. A vehicle traction controller comprising:
    means for determining a friction value indicative of the frictional resistance of the surface upon which the vehicle is traveling;
    means, responsive to said friction value, for determining an actual average slip value, indicative of actual average slippage of driving wheels of said vehicle relative to the surface below the driving wheels;
    means, responsive to a plurality of wheel speed signals, each of said wheel speed signals indicative of the rotational speed of a corresponding driving wheel of said vehicle, for comparing each of the wheel speed signals to generate a maximum rotational speed value which is indicative of the rotational speed of the driving wheel having the greatest rotational speed;
    means, responsive to said actual average slip value, for controlling power generated by an engine of the vehicle to reduce the difference between said actual average slip value and a desired slip value; and
    means, responsive to the maximum rotational speed value, for generating a braking force value, which is indicative of a braking force to be applied to the wheel corresponding to said maximum rotational speed value, to reduce the rotational speed of said wheel.

2. The invention as set forth in claim 1 wherein the means for controlling power generated by the vehicle engine to reduce the difference between said actual average slip value and a desired slip value comprises:
    means for generating a spark retard value, as a function of said difference between said actual average slip value and said desired slip value, to retard spark timing by an amount corresponding to said spark retard value; and
    means for generating an electronic throttle control value, as a function of said difference between said actual average slip value and said desired slip value, for controlling the position of an electronically controlled throttle to reduce the mass flow rate of air entering an intake manifold of the engine.

3. The invention as set forth in claim 2 wherein the means for generating a spark retard value comprises:
    means for comparing said frictional value to a spark friction threshold value; and
    means, responsive to said frictional value being less than said spark friction threshold value, for generating said spark retard value.

4. The invention as set forth in claim 3 wherein the electronically controlled throttle is positioned downstream of a driver actuated throttle, and wherein the means for generating an electronic throttle control value generates said value in accordance with a proportional-integral-differential control technique.

5. The invention as set forth in claim 4 wherein the means for generating a braking force value comprises:
    means, responsive to a plurality of wheel speed signals, for determining the rotational speed of each of the driving wheels;
    means for generating a desired maximum wheel speed value as a function of vehicle speed;
    means for comparing the rotational speed of each of the driving wheels to said desired maximum wheel speed value and for generating a difference value indicative of the difference in the rotational speed of the driving wheels;
    means responsive to rotational speed of one of the driving wheels being greater than said desired maximum wheel speed value and said difference value being greater than a threshold difference value for generating said braking force value;
    means for comparing the rotational speed of each of the driving wheels to a desired wheel speed value, and for gradually reducing said braking force value if the rotational speed of each of the driving wheels is below said desired wheel speed value.

6. The invention as set forth in claim 1 wherein the means for generating a braking force value comprises:

means, responsive to a plurality of wheel speed signals, for determining the rotational speed of each of the driving wheels;

means for generating a desired maximum wheel speed value as a function of vehicle speed;

means for comparing the rotational speed of each of the driven wheels to said desired maximum wheel speed value and for generating a difference value indicative of the difference in the rotational speed of the driving wheels;

means responsive to rotational speed of one of the driving wheels being greater than said desired maximum wheel speed value and said difference value being greater than a threshold difference value for generating said braking force value;

means for comparing the rotational speed of each of the driving wheels to a desired wheel speed value, and for gradually reducing said braking force value if the rotational speed of each of the driving wheels is below said desired wheel speed value.

7. In a vehicle which includes at least one pair of driving wheels, a method of controlling traction of said driving wheels comprising:

determining a friction value indicative of the frictional resistance of the surface below said driving wheels;

determining an actual slip value indicative of actual average slippage of said vehicle relative to the surface below the driving wheels;

generating a gas pedal position value which is indicative of the position of a driver actuated gas pedal;

determining a desired slip value, indicative of desired average slippage of said vehicle relative to the surface below the driving wheels, as a function of said friction value and the speed of said vehicle;

determining a driving wheel speed value indicative of the average rotational speed of said driving wheels;

comparing said driving wheel speed value to a threshold value;

checking an engine traction control enabled flag which is indicative of the operation of an engine traction control routine;

if said driving wheel speed value is greater than said threshold value, and if said engine traction control enable flag indicates that said engine traction control routine is operating then executing the engine traction control routine which comprises the steps of, comparing said friction value to a second threshold value, and if said friction value indicates a frictional resistance less than a frictional resistance corresponding to said second threshold value, then generating a spark change value to alter spark timing by an amount corresponding to said spark change value, generating a throttle position value to alter the mass flow rate of air entering an intake manifold of the engine by an amount corresponding to said throttle position value, comparing said throttle position value to a maximum position value which is indicative of a maximum amount of air entering said intake manifold;

if said throttle position value is greater than or equal to said maximum position value then, reducing said throttle position value to equal said maximum position value and altering said engine traction control enabled flag to disable execution of said engine traction control routine, and exiting said engine traction control routine;

otherwise, comparing said gas pedal position value to a gas pedal threshold value, and checking a driver braking signal which indicates if the vehicle driver is applying the vehicle brakes, and if said gas pedal position value indicates driver desired engine power which is less than engine power corresponding to said gas pedal threshold value or if said driver braking signal indicates application of vehicle brakes by the vehicle driver, then altering said throttle position value to equal said maximum position value and altering said engine traction control enabled flag to disable execution of said engine traction control routine and exiting said engine traction control routine;

executing a brake traction control routine which comprises the steps of, determining the rotational speed of each of the driving wheels of the vehicle and comparing each of the rotational speeds to a brake threshold value, and if the rotational speed of at least one of the driving wheels is greater than said brake threshold value, and if the difference between the rotational speeds of each of the driving wheels is greater than a difference threshold value then, causing application of a traction control braking force to the driving wheel which has the highest rotational speed, said braking force being a function of the difference between the rotational speed of the driving wheel which has the highest rotational speed and a desired wheel speed; and determining the rotational speed of each of the driving wheels and gradually reducing to zero said traction control braking force if the rotational speed of each of the driving wheels is below a brake control exit speed for a predetermined period of time.

8. The method as set forth in claim 7 wherein the brake control routine comprises the further additional step of determining the position of a driver actuated gas pedal and gradually reducing to zero said traction control braking force if the position of the driver actuated gas pedal corresponds to an amount of vehicle power which is less than a predetermined brake control exit power value for a predetermined period of time.

9. The method as set forth in claim 8 wherein the step of determining the rotational speed of each of the driven wheels and gradually reducing to zero said traction control braking force if the rotational speed of each of the driven wheels is below a brake control exit speed for a predetermined period of time comprises the additional step of checking said engine traction control enable flag and gradually reducing said traction control braking force if said engine traction control enable flag indicates that said engine traction control routine is disabled.

10. In a vehicle which includes at least one pair of driven wheels, a method of controlling traction of said driven wheels comprising the steps of:

generating a surface friction value indicative of the frictional resistance of the surface beneath the driven wheels;

generating an average driven wheel speed value indicative of the average rotational speed of said driven wheels;

comparing said average driven wheel speed value to a predetermined threshold value, and if said driven wheel speed value is greater than said predetermined threshold value then performing a traction control routine which comprises, an engine control routine which alters the power generated by an engine of the vehicle, by
- comparing said surface friction value to a predetermined spark control friction threshold value, and if said surface friction value indicates a frictional resistance of the surface beneath the driven wheels which is less than a frictional resistance corresponding to said predetermined spark control friction threshold value, then retarding spark timing, by a spark alteration value which is generated as a function of a slip error value which is indicative of a difference between the average amount of wheel slip of said driven wheels and a desired average amount of wheel slip of said driven wheels;
- altering, as a function of said slip error value, the position of an electronically controlled throttle to change the mass flow rate of air entering an intake manifold of the engine; and
- eliminating the amount by which engine power is altered by said engine control routine if the position of a vehicle gas pedal indicates an amount of engine power which is below a predetermined level, or if a vehicle driver is causing the application of the vehicle brakes;

a brake control routine which causes the application of a braking force to said driven wheels and which comprises the steps of,
- determining if the vehicle driver is causing the application of the vehicle brakes, and if not then comparing the rotational speed of each of the driven wheels to a maximum rotational value, and if the rotational speed of a driven wheel is greater than said maximum rotational value, then determining the difference between the rotational speeds of the driven wheels, and if said difference is greater than a predetermined difference value then generating a braking force to be applied to the driven wheel with the highest rotational speed, said braking force being generated as a function of the rotational speed of the driven wheel with the highest rotational speed,
- performing a brake control exit test by determining if the vehicle driver is causing the application of the vehicle brakes and if so, then eliminating the braking force applied by the brake control routine and exiting the brake control routine, otherwise, determining if the position of a vehicle gas pedal corresponds to an amount of engine power which is below a predetermined threshold power output, and if so then gradually reducing braking force applied by the brake control routine, otherwise, determining if the rotational speed of each of the driven wheels is less than a threshold wheel speed and if so then gradually reducing braking force applied by the brake control routine.

* * * * *